(12) United States Patent
Marcicki et al.

(10) Patent No.: US 9,843,069 B2
(45) Date of Patent: Dec. 12, 2017

(54) BATTERY CAPACITY DEGRADATION RESOLUTION METHODS AND SYSTEMS

(71) Applicant: Ford Global Technologies, LLC, Dearborn, MI (US)

(72) Inventors: James Matthew Marcicki, Livonia, MI (US); OuJung Kwon, Novi, MI (US); Theodore James Miller, Milan, MI (US); Xiao Guang Yang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 544 days.

(21) Appl. No.: 14/497,785

(22) Filed: Sep. 26, 2014

(65) Prior Publication Data
US 2016/0093927 A1    Mar. 31, 2016

(51) Int. Cl.
*H01M 10/48* (2006.01)
*H01M 10/0525* (2010.01)
*H01M 10/42* (2006.01)

(52) U.S. Cl.
CPC ... *H01M 10/0525* (2013.01); *H01M 10/4257* (2013.01); *H01M 10/482* (2013.01); *H01M 2010/4271* (2013.01); *H01M 2220/20* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 5,404,106 A | 4/1995 | Matsuda | |
| 5,847,566 A | 12/1998 | Marritt et al. | |
| 6,114,838 A | 9/2000 | Brink et al. | |
| 7,983,863 B2* | 7/2011 | Jin | G01R 31/3624 702/63 |
| 8,084,996 B2 | 12/2011 | Zhang et al. | |
| 8,390,257 B2 | 3/2013 | Inoue et al. | |
| 2011/0161025 A1* | 6/2011 | Tomura | G01R 31/3651 702/63 |
| 2012/0105068 A1* | 5/2012 | Wang | H01M 10/48 324/427 |
| 2012/0136594 A1 | 5/2012 | Tang et al. | |
| 2012/0239325 A1 | 9/2012 | Sunyi et al. | |

(Continued)

*Primary Examiner* — Ula C Ruddock
*Assistant Examiner* — Amanda Barrow
(74) *Attorney, Agent, or Firm* — David B. Kelley; Brooks Kushman P.C.

(57) ABSTRACT

A vehicle can include a traction battery and a controller in communication with the battery to determine the battery state using sensed battery electrode capacity to account for battery aging. The sensed battery electrode capacity can be dependent on active lithium ions at a positive electrode of the traction battery. The controller can compare a battery voltage model to measured battery voltage during a vehicle drive cycle, receive sensed current though put data and open circuit voltage at the battery, and determine if a deviation threshold is exceeded. The controller can also correct electrode capacity using a mean of the measured open-circuit voltage to correct the capacity error to less than one amp-hour or initiate an active lithium capacity correction using a variance of the current throughput to correct the capacity error to less than one amp-hour. This information can be used to control the vehicle and battery usage.

19 Claims, 12 Drawing Sheets

(56) References Cited

U.S. PATENT DOCUMENTS

| | | | |
|---|---|---|---|
| 2012/0316810 A1 | 12/2012 | Syed et al. | |
| 2013/0006455 A1 | 1/2013 | Li | |
| 2013/0076363 A1* | 3/2013 | Takahashi | G01R 31/3634 324/427 |
| 2013/0099794 A1* | 4/2013 | Takahashi | H01M 10/0525 324/427 |
| 2013/0110428 A1 | 5/2013 | Sun et al. | |
| 2013/0317771 A1* | 11/2013 | Laskowsky | H01M 10/482 702/63 |
| 2014/0272653 A1* | 9/2014 | Chaturvedi | H01M 8/04552 429/431 |

* cited by examiner

BATTERY CAPACITY DEGRADATION RESOLUTION METHODS AND SYSTEMS

TECHNICAL FIELD

Systems and methods relating to correcting for battery capacity changes are described herein.

BACKGROUND

Hybrid electric vehicles (HEV) utilize a combination of an internal combustion engine with an electric motor to provide motive power. This arrangement provides improved fuel economy over a vehicle that has only an internal combustion engine. One method of improving the fuel economy in an HEV is to shutdown the fuel-consuming engine during times that the engine operates inefficiently, and is not otherwise needed to propel the vehicle. In these situations, the electric motor is used to provide all of the power needed to propel the vehicle. When the driver power demand increases such that the electric motor can no longer provide enough power to meet the demand, or in other cases such as when the battery state of charge (SOC) drops below a certain level, the engine provides the motive power for the vehicle.

The HEV includes a battery management system that regulates operation of the battery and estimates values descriptive of the battery's present operating conditions. The battery pack and/or cell operating conditions include battery SOC, power fade, capacity fade, and instantaneous available power.

SUMMARY

A vehicle includes a traction battery and a controller in communication with the traction battery to determine the battery state using sensed battery electrode capacity to account for battery aging. In an example, the sensed battery electrode capacity is dependent on active lithium ions at a positive electrode of the traction battery. And, the controller is configured to compare a battery voltage model to measured battery voltage during a vehicle drive cycle. The controller may receive sensed current though put data and open circuit voltage at the battery and determine whether a deviation threshold is exceeded The controller may initiate an electrode capacity correction using a mean of the electrode capacity residual to correct the capacity error to less than one amp-hour. The controller may also initiate an active lithium capacity correction using a variance of the electrode capacity residual to correct the capacity error to less than one amp-hour.

Various methods can be performed using the above vehicle structures and computing modules. A method can include sensing traction battery current and voltage, employing a feedback algorithm using sensed battery current and voltage to estimate state of charge, calculating battery electrode capacity using sensed current and change in state of charge, determining electrode capacity during a drive period, and if electrode capacity exceeds a threshold, updating a parameter used to determine state of charge of the battery. In an example, the method can include determining whether a mean threshold or a variance threshold is violated. If the mean threshold is violated, a mean parameter is decreased. If the variance parameter is violated, a variance parameter is decreased and an active lithium parameter is updated in a state of charge calculation.

If the variance parameter is violated, voltage error may be calculated from state of charge error using current integration. If the variance parameter is violated, active lithium may be estimated using a previous active lithium parameter, voltage error and negative electrode open circuit voltage. Sensing traction battery current and voltage may be dependent on active lithium ions at a positive electrode of the traction battery. Traction battery current and voltage may be measured during a vehicle drive cycle. Sensing traction battery current and voltage may include sensing current though put data at a given state of charge and open circuit voltage at the battery. Updating a parameter may include initiating an electrode capacity correction using a mean of the electrode capacity residual to correct the capacity error to less than one amp-hour. Updating a parameter may include initiating an active lithium capacity correction using a variance of the electrode capacity residual to correct the capacity error to less than one amp-hour. The vehicle may be a plug-in electric hybrid vehicle (PHEV) or a battery electric vehicle (BEV).

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Systems and methods described herein estimate certain contributions to battery capacity reductions or fade, e.g., electrode contributions to battery capacity fade in electric vehicles such as plug-in electric hybrid vehicles (PHEVs) or battery electric vehicles (BEVs). In an example, a battery voltage model is compared to measurements of the battery voltage during a drive cycle to generate a residual based on estimated capacity to determine when the battery has aged a significant amount, and if so, to update battery management system (BMS) parameters to reflect the battery performance degradation. Battery performance degradation is a naturally occurring phenomenon of batteries. There can be several examples of the battery performance model, including phenomenological or first-principles models, with the caveat that the electrical potential of the electrodes is predicted individually and the potential difference of the electrodes approximates the voltage measured at the battery terminals. Examples described herein can use a mathematical model (e.g., a linear dynamic model with a nonlinear output equation), but other variations of linear and nonlinear models are possible. The mathematical model can include instructions, parameters and data stored in the vehicle for execution on modules and processors. In an example, the measured battery terminal voltage and current are supplied to modules or processors to implement the performance model. The performance model adds the predicted negative electrode potential to the measured terminal voltage to obtain a measured positive electrode potential.

Figure 1:
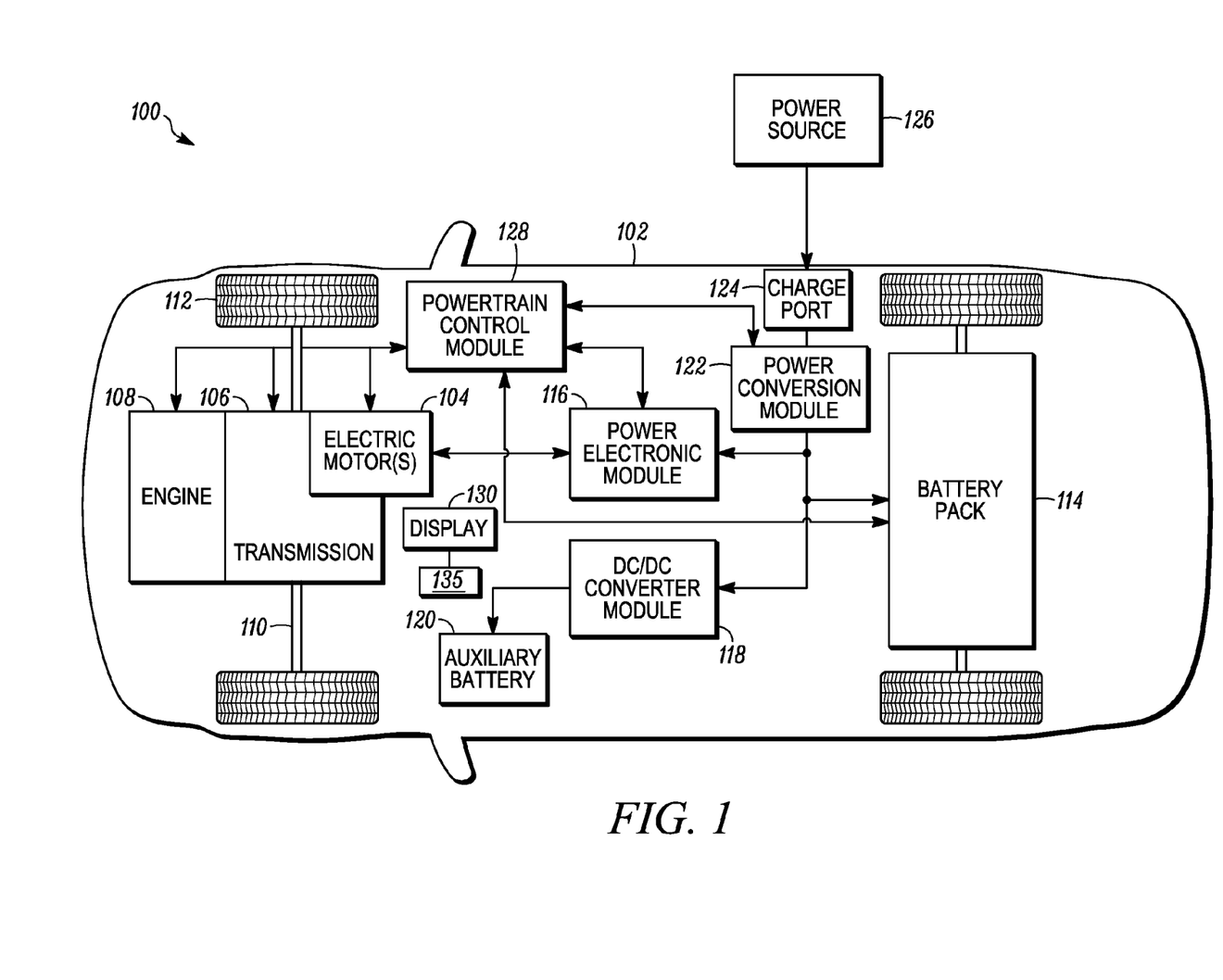
FIG. 1 is a hybrid electric vehicle that can be used with the described systems and methods.

FIG. 1 depicts an example of a hybrid-electric vehicle 102, e.g., a plug-in hybrid-electric vehicle. A plug-in hybrid-electric vehicle 102 may comprise one or more electric motors 104 mechanically connected to a hybrid transmission 106. In addition, the hybrid transmission 106 is mechanically connected to an engine 108. The hybrid transmission 106 may also be mechanically connected to a drive shaft 110 that is mechanically connected to the wheels 112. The electric motors 104 can provide torque to the wheels when the engine 108 is turned on. Electric motor 104 consumes electrical energy from a battery 114 to provide torque to propel the vehicle 102. The electric motors 104 can provide deceleration capability when the engine 108 is turned off. The electric motors 104 may be configured as generators and can provide fuel economy benefits by recovering energy that would normally be lost as heat in the friction braking system. The electric motors 104 may also reduce pollutant emissions since the hybrid electric vehicle 102 may be operated in electric mode under certain conditions.

The traction battery or battery pack 114 stores energy that can be used by the electric motors 104. A vehicle battery pack 114 typically provides a high voltage DC output. The battery output is made in response to a battery power request, which can be calculated from the feedforward battery power value as a function of the driver power request and the engine power request, which in turn can be based on the speed and torque determinations. The battery pack 114 is electrically connected to a power electronics module 116. The power electronics module 116 is also electrically connected to the electric motors 104 and provides the ability to bi-directionally transfer energy between the battery pack 114 and the electric motors 104. For example, a typical battery pack 14 may provide a DC voltage while the electric motors 104 may require a three-phase AC current to function. The power electronics module 116 may convert the DC voltage to a three-phase AC current as required by the electric motors 104. In a regenerative mode, the power electronics module 116 will convert the three-phase AC current from the electric motors 104 acting as generators to the DC voltage required by the battery pack 114. The methods described herein are equally applicable to a pure electric vehicle or any other device using a battery pack. In an example, the power control module 116 includes processors, memory, sensors and other circuitry to interact with the battery 114 and measure its parameters, e.g., voltage and current at various times to determine the open circuit voltage of the battery 114. These battery parameters including, for example, open-circuit voltage are then used by vehicle controls, e.g., the power electronic module 116, the powertrain control module 128, or other, to control vehicle functions.

The battery 114 can experience degradation during certain uses of the vehicle. One use in which degradation occurs is storage at a high state of charge (SOC). Temperature can also be a factor in battery degradation. Battery degradation can include the inability of a battery 114 to hold a quantity of charge, e.g., less kW-hours or amp-hours stored in the battery 114. The battery degradation can occur over the life of the battery.

Over time and as a function of the utilization required by the vehicle powertrain and environmental conditions, battery power and energy degrade in a process known as aging. In a laboratory setting, battery aging can be characterized by specific tests that involve commanding a current and monitoring the battery voltage. In a vehicle, these laboratory tests are not possible. Therefore energy and power cannot be directly measured throughout the vehicle's useful life. The degradation of these battery performance metrics should be included within the BMS algorithms, which can be implemented in the power electronic module 116, the powertrain control module 128, or other on-board vehicle computing devices, to ensure that accurate knowledge of the battery capabilities is maintained throughout the electrified vehicle's useful life. To address this concern, models based on laboratory data are used to predict the aging that will occur for the expected battery operating conditions. Such models can be stored in memory in the vehicle. Methods for modifying or confirming the aging model predictions based on physical measurements would reduce the uncertainty of this process and are part of the present disclosure.

Battery performance degradation can come from many sources, but the contribution to aging from each source cannot be measured solely based on the terminal voltage. Although aging processes are complex, at a minimum level of detail either electrode or a decrease in the amount of active lithium may contribute to capacity loss. Data that identifies the aging contribution from each electrode could be used by the BMS to reduce the uncertainty associated with performance capability estimates, allowing more aggressive, efficient battery usage.

Methods to correct the energy and power estimates of the BMS using non-intrusive measurements obtained during vehicle operation will enable a quality user experience with an electric vehicle and provide adequate battery performance throughout vehicle life. Accomplishing this task using methods that account for electrode-resolved contributions to aging may provide superior accuracy compared with standard methods.

In addition to providing energy for propulsion, the battery 114 (or battery pack) may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V battery 120. An all-electric vehicle may have a similar architecture but without the engine 108.

The battery pack 114 may be recharged by an external power source 126. The battery charge storage status can be measured as state of charge. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric motors, battery, power conversion and power electronics may be controlled by a powertrain control module (PCM) 128.

In addition to illustrating a plug-in hybrid vehicle, FIG. 1 can illustrate a battery electric vehicle (BEV) if, for example, component 108 is removed. Likewise, FIG. 1 can illustrate a traditional hybrid electric vehicle (HEV) or a power-split hybrid electric vehicle if, for example, components 122, 124, and 126 are removed. FIG. 1 also illustrates the high voltage system which includes the electric motor(s), the power electronics module 116, the DC/DC converter module 118, the power conversion module 122, and the battery pack 114. The high voltage system and battery pack includes high voltage components including bus bars, connectors, high voltage wires, and circuit interrupt devices.

Vehicle 102 further includes a display 130 that can show data regarding the state of the vehicle, e.g., state of the electrical system and battery 114, as well as vehicle use/non-use data. A data generator 135 can be connected to the display to compute and organize the data for the display 130. In an example, the display 130 can show the battery state as an estimated or derived state.

Figure 2:
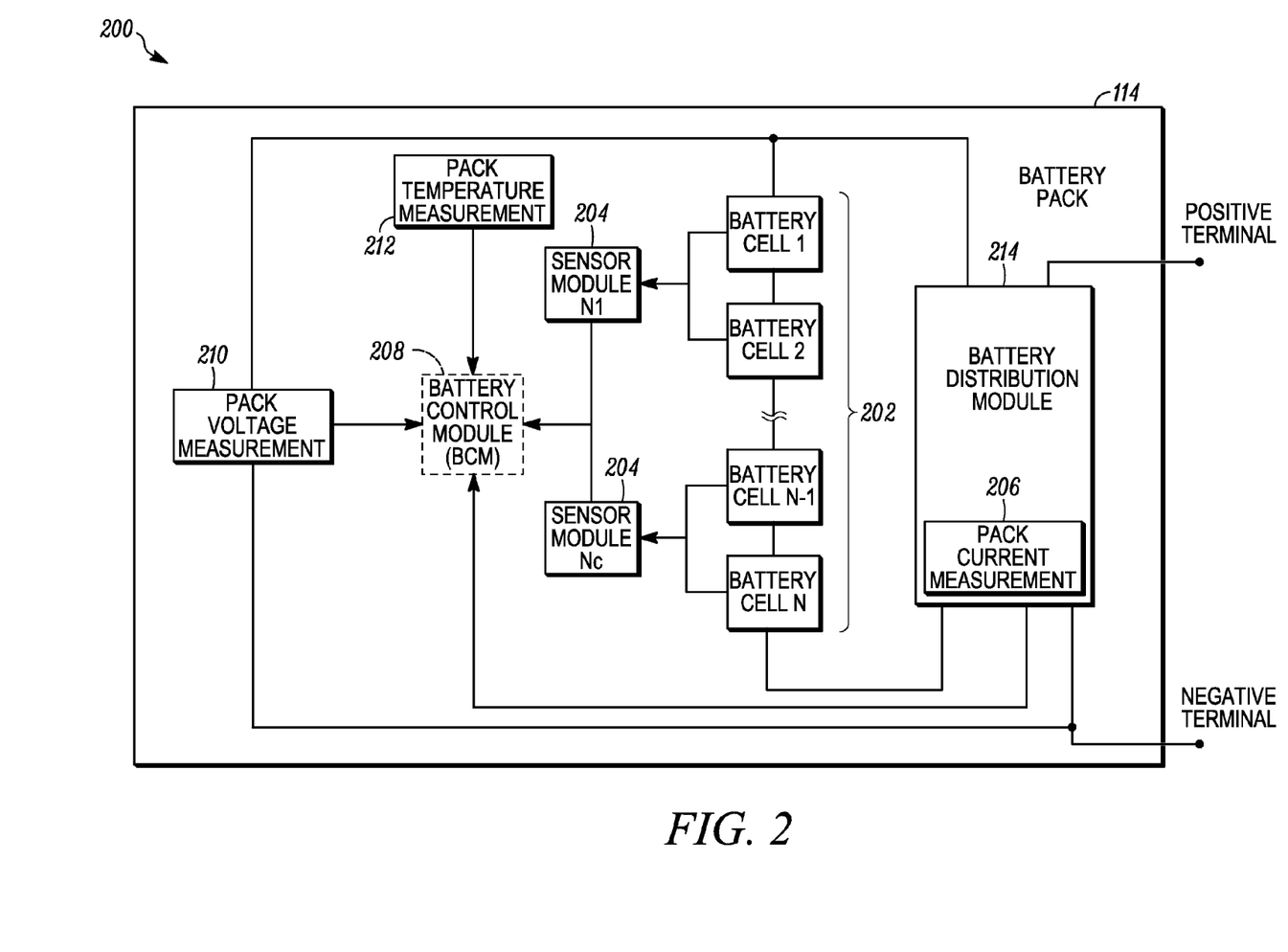
FIG. 2 is a detailed view of the battery for a hybrid electric vehicle.

The individual battery cells within a battery pack may be constructed from a variety of chemical formulations. Typical battery pack chemistries may include but are not limited to lead acid, nickel cadmium (NiCd), nickel-metal hydride (NIMH), Lithium-Ion or Lithium-Ion polymer. FIG. 2 shows a typical battery pack 200 in a simple series configuration of N battery cell modules 202. The battery cell modules 202 may contain a single battery cell or multiple battery cells electrically connected in parallel. The battery pack, however, may be composed of any number of individual battery cells and battery cell modules connected in series or parallel or some combination thereof. A typical system may have one or more controllers, such as a Battery Control Module (BCM) 208 that monitors and controls the performance of the battery pack 200. The BCM 208 may monitor several battery pack level characteristics such as pack current measured by a current sensor 206, pack voltage 210 and pack temperature 212. The performance of the current sensor 206 may be essential, in certain arrangements, to build a reliable battery monitoring system. The accuracy of the current sensor may be useful to estimate the battery state of charge and capacity. A current sensor may utilize a variety of methods based on physical principles to detect the current including a Hall effect IC sensor, a transformer or current clamp, a resistor in which the voltage is directly proportional to the current through it, fiber optics using an interferometer to measure the phase change in the light produced by a magnetic field, or a Rogowski coil. In the event a battery cell is charging or discharging such that the current entering or exiting the battery cell exceeds a threshold, the battery control module may disconnect the battery cell via the use of a circuit interrupt device (CID) such as a fuse or circuit breaker. The battery capacity can be affected by the availability of free charge, e.g., from $Li^+$, available at an electrode. This can be caused by mechanical or electrically insulating barriers on the electrode, which can build up over time, or by lack of chemistries that provide charge at the electrode.

In addition to the pack level characteristics, there may be battery cell level characteristics that need to be measured and monitored. For example, the terminal voltage, current, and temperature of each cell may be measured. A system may use a sensor module 204 to measure the characteristics of one or more battery cell modules 202. The characteristics may include battery cell voltage, temperature, age, number of charge/discharge cycles, etc. Typically, a sensor module will measure battery cell voltage. Battery cell voltage may be voltage of a single battery or of a group of batteries electrically connected in parallel or in series. The battery pack 200 may utilize up to $N_c$ sensor modules 204 to measure the characteristics of all the battery cells 202. Each sensor module 204 may transfer the measurements to the BCM 208 for further processing and coordination. The sensor module 204 may transfer signals in analog or digital form to the BCM 208. The battery pack 200 may also contain a battery distribution module (BDM) 214 which controls the flow of current into and out of the battery pack 200.

In an example, the battery control module 208 includes processors, memory, sensors and other circuitry to sense the battery's electrical performance and state and to derive meaningful parameters relating to the battery's state and performance. The battery parameters are then used by vehicle controls or battery management system, e.g., the battery control module 208, the power electronic module 116, the powertrain control module 128, or other, to control vehicle functions.

Figure 3:
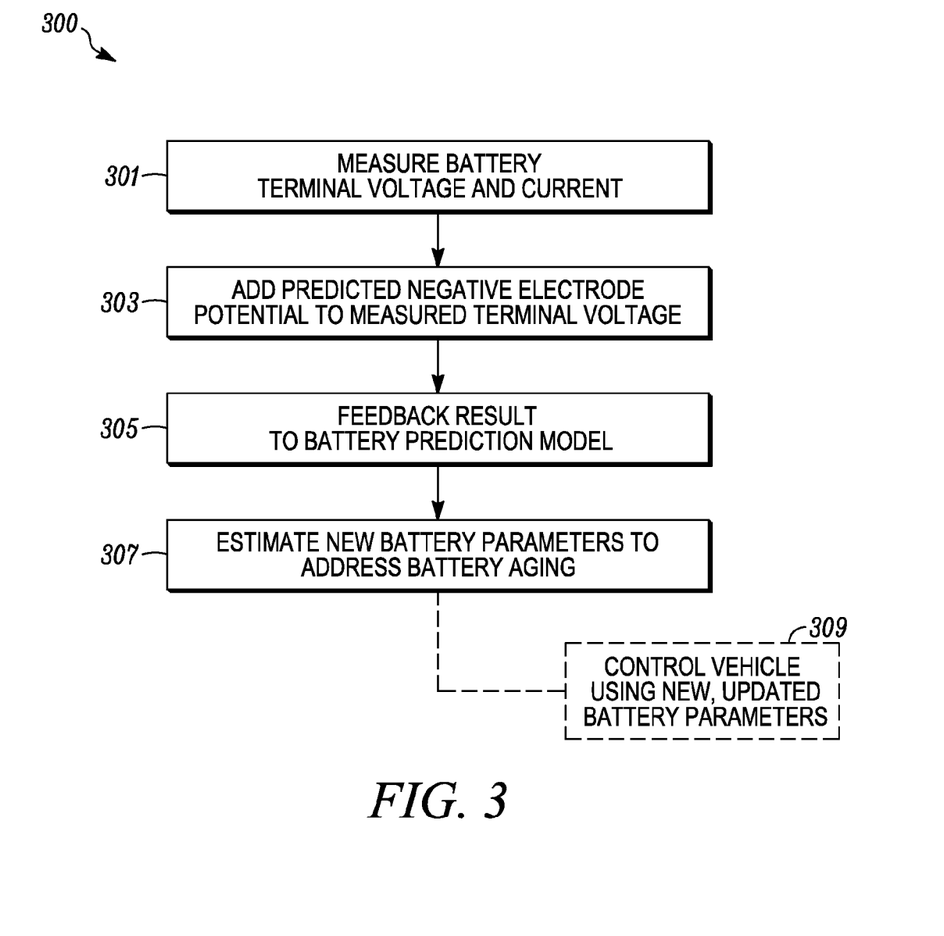
FIGS. 3 through 5 are flow charts of methods for determining battery parameters.

FIG. 3 shows a method 300 for updating battery parameters used in the vehicle for various computations, and possibly controlling vehicle performance as it relates to the battery. At 301, the battery terminal voltage is measured. In an example, this is the open circuit voltage during a vehicle drive time period. The current is supplied at an estimated State of Charge (SOC) and demand is measured. At 303, the predicted negative battery electrode potential is added to the measured terminal voltage. The resulting value is fed back to a battery prediction model within the vehicle's BMS. At 307, new battery parameters are estimated to address the effects of battery capacity fade, which can be a natural phenomenon of batteries in use. At 309, the new battery parameters can, optionally, be used to control the vehicle.

Figure 4:
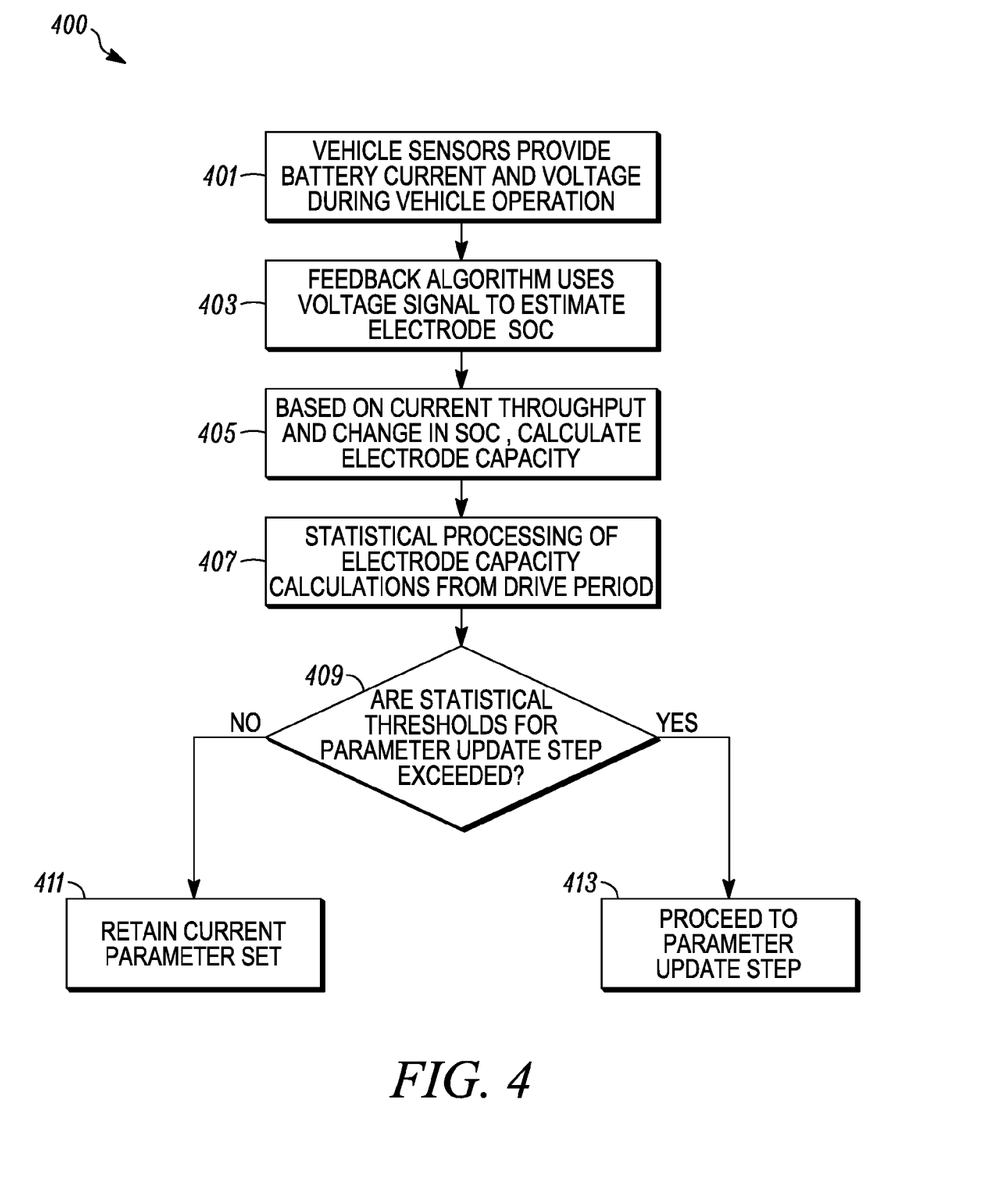

FIG. 4 shows a method 400 for testing battery parameters, which can be used to confirm the current battery model stored in the BMS. The method can estimate electrode-resolved contributions to battery capacity fade by comparing a battery voltage model with measurements of the battery voltage during a drive cycle, generate a residual based on estimated capacity to determine if the battery has aged a significant amount, and if so, to update BMS parameters to reflect the battery performance degradation.

Figure 7:
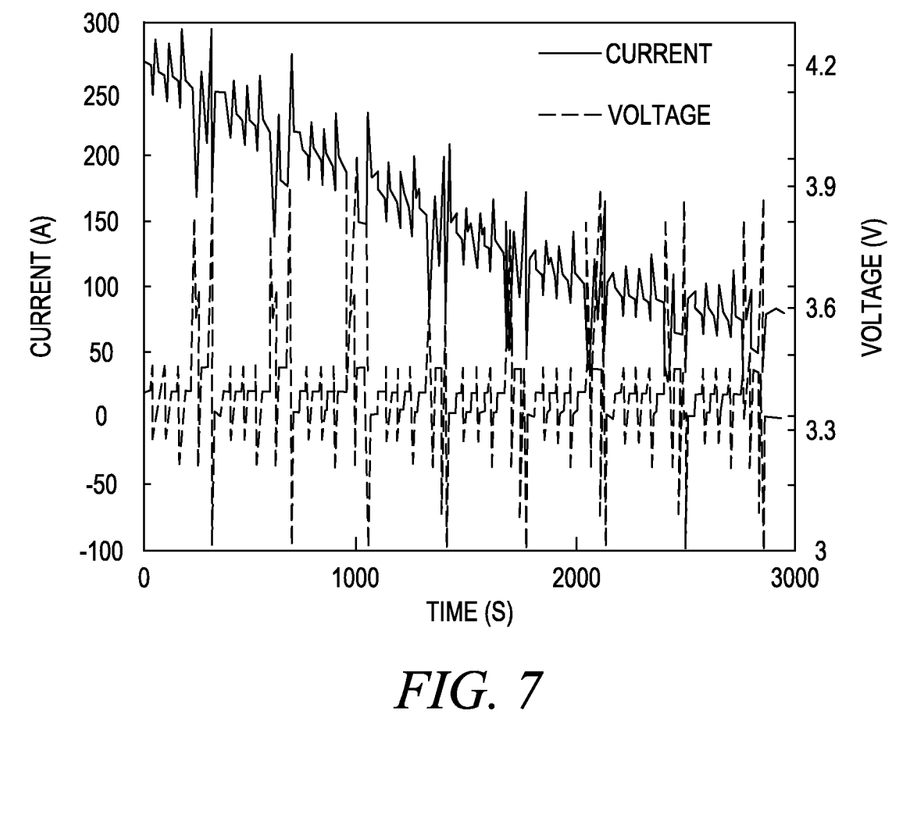
FIG. 7 is a graph of sensed voltage and current at a traction battery during vehicle use.

At 401, the vehicle sensor(s) sense the battery current and/or voltage while the vehicle is in operation. An example of the sensed signals is shown in FIG. 7. The current sensed can be the current supplied versus the current being commanded by the BMS. The voltage being sensed can be the voltage at the battery terminal. Sensing while the vehicle is in use provides for an actual parameter that can be used in the vehicle and not a theoretical estimate.

Figure 8:
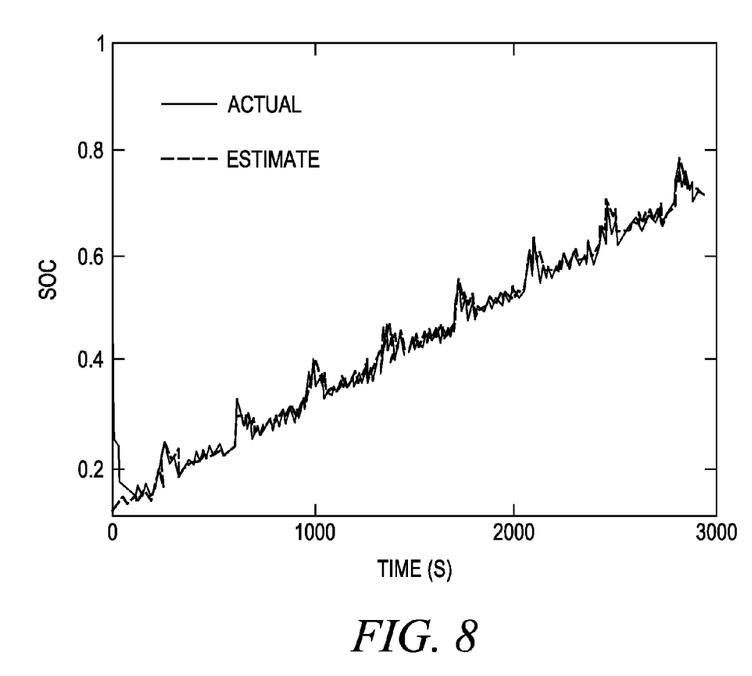
FIG. 8 is a graph of actual and estimated state of charge values.

At 403, the sensed voltage signal over time is used to estimate the electrode SOC. The actual measured voltage is compared to the estimated voltage. The estimated voltage is determined by the current battery model. In an example, the modules, processors and circuitry in the vehicle can store and apply a battery model to estimate the effect of voltage on cell impedance, and then remove the impedance effects from the voltage measurement and treat the compensated voltage as open-circuit voltage. Processing the battery model provides a well-defined relationship between open-circuit voltage and cell SOC that is characterized and stored in the vehicle. The model and relationship can be installed in the vehicle before the battery system is put in use by the consumer. An example of the actual and estimated SOC is shown in FIG. 8.

At 405, the electrode capacity is calculated using the sensed current throughput. Current throughput is the time integral of the current signal. In an example, the time interval begins at vehicle key-on and ends at several points throughout the drive cycle to generate a residual signal, e.g., as plotted in FIG. 9. Electrode capacity can also be dependent on a change in the SOC. Using the sensed current of the cell and the change in the SOC over the same time period, the electrode capacity is calculated.

Figure 10:
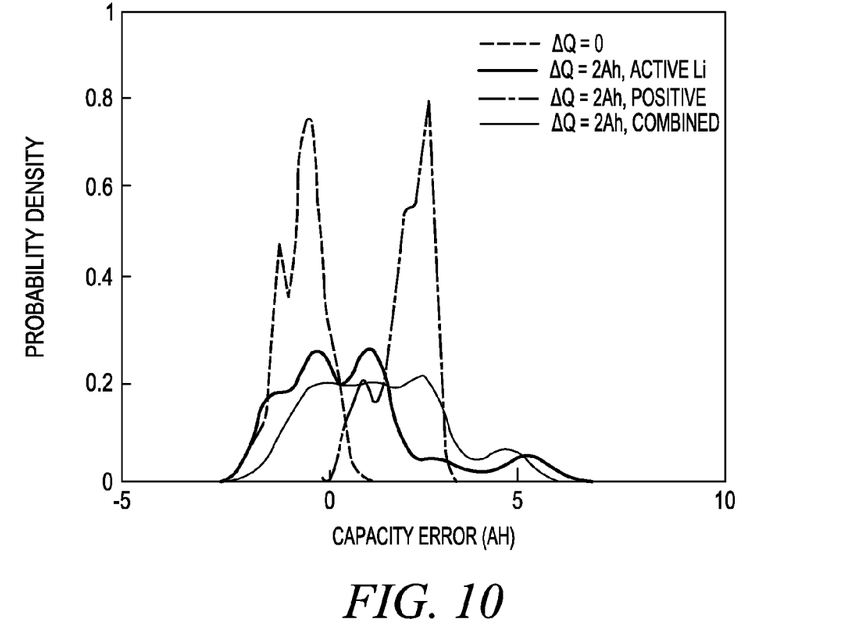
FIG. 10 is a graph of electrode capacity calculations.

At 407, statistical processing of the electrode capacity is performed. Depending on the error residual properties, the capacity fade contribution of each electrode is estimated. For example, the mean and variance of the residual for the entire drive cycle may be calculated. If the statistics satisfy certain threshold criteria, then the likely degradation mechanism is determined and the BMS parameters for the associated electrode can be corrected to account for the present level of degradation. An example of potential errors is shown in FIG. 10. The mean is approximately zero in the un-aged case and becomes greater than zero during aging if the capacity fade is caused by the positive electrode. The new capacity value is estimated directly from the shift of the residual mean, and model parameters are updated to reflect the new electrode capacity. The variance of the residual is not affected, and correcting the mean restores the estimator residual to its nominal level.

At 409, a comparison of calculated battery parameters to thresholds is made. If the calculated battery parameters do not exceed the threshold value, then the method retains the current battery parameters, step 413. If the calculated battery parameters exceed the threshold value, then the method proceeds to a battery parameter update step, 413. The battery parameter update step is described below with reference to FIG. 5.

Figure 5:
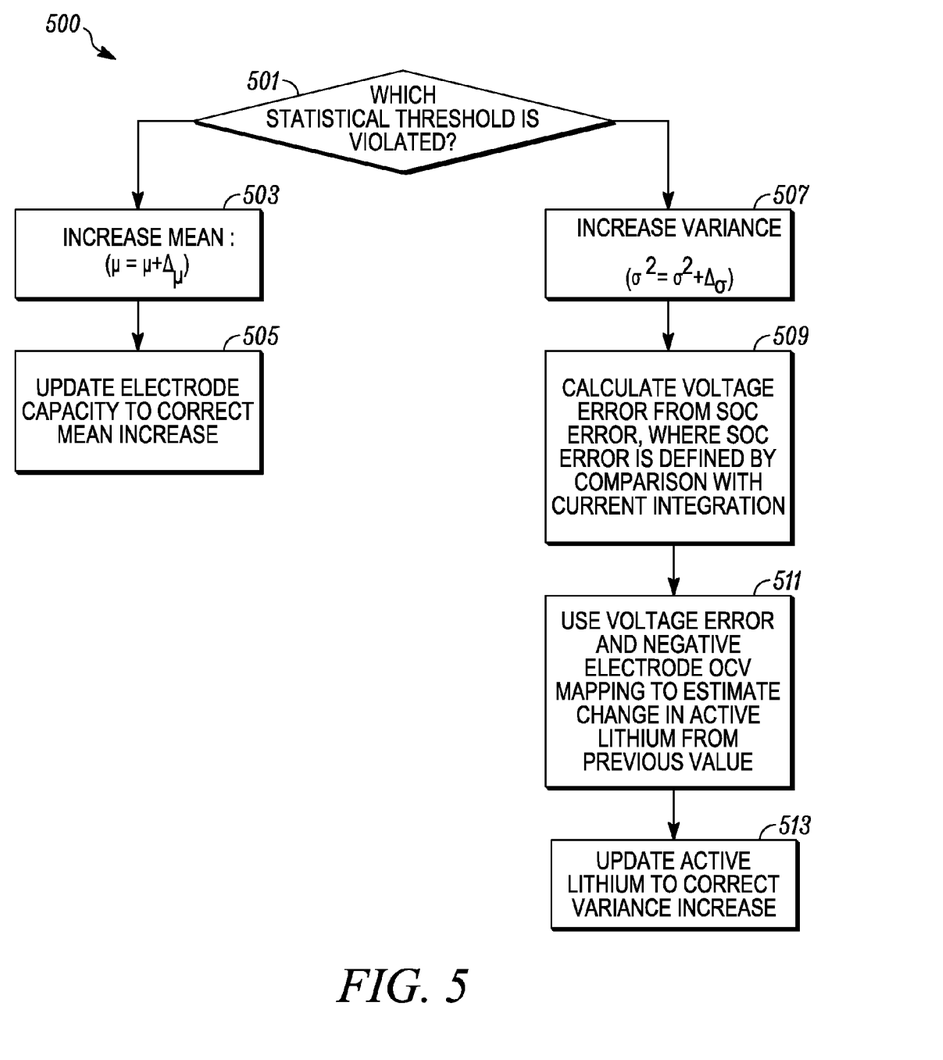

FIG. 5 shows a method 500 for determining whether the battery model stored in the vehicle is valid. At 501, it is determined whether a threshold of a battery parameter is violated. A module or processor as part of the BMS can perform this determination. The battery parameters can be the open-circuit voltage, the electrode capacity, the state of charge, or combinations thereof. In an example, the electrode capacity is determined using open-circuit voltage and state of charge. The electrode capacity is then compared with threshold parameters, and if the thresholds are violated, then the model may be updated. If the statistical threshold being violated is the mean, then the process moves to the process flow of steps 503-505. If the statistical threshold being violated is the variance, then the process moves to the process flow of steps 507-513.

Figure 14:
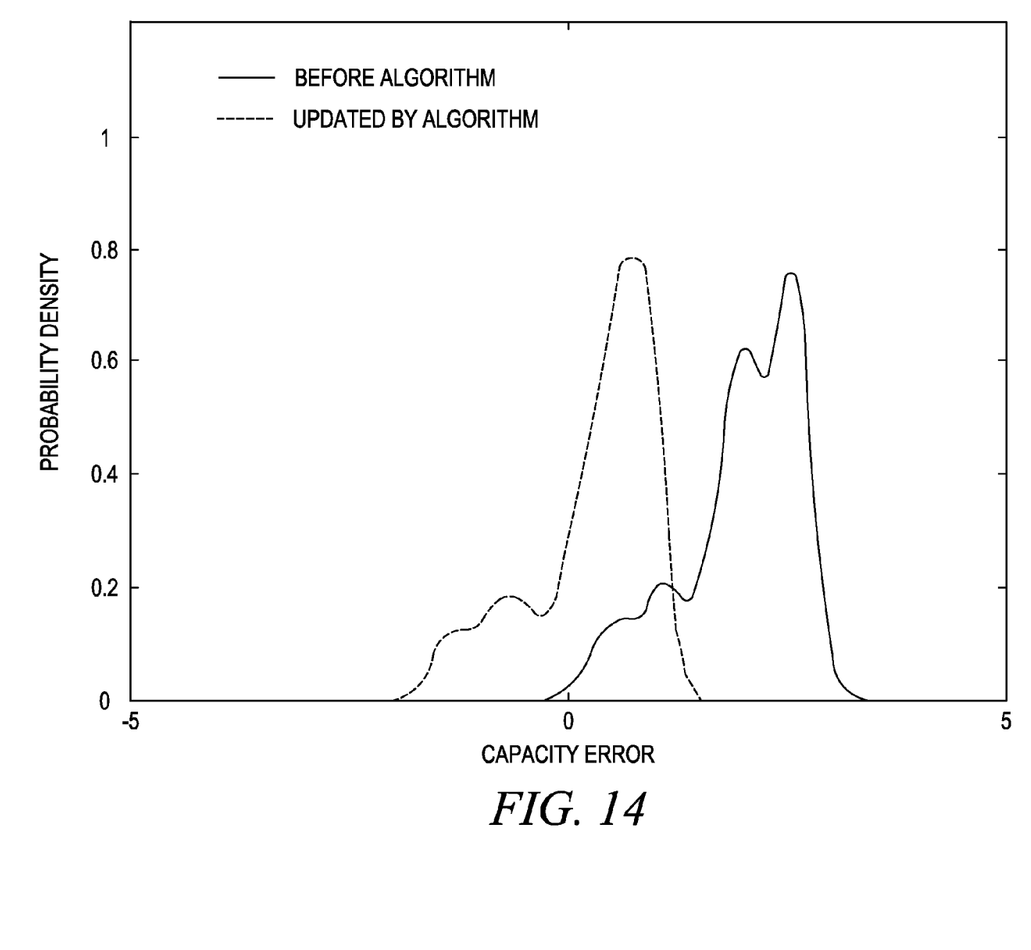
FIG. 14 is a graph of correcting error in the battery model.

At 503, the mean is increased by the change determined in the prior steps, e.g., by using $\mu = \mu + \Delta\mu$. At 505, the electrode capacity is updated to correct its parameter in the battery model within the BMS to reduce the error. The reduction of error is shown in FIG. 14. The mean for an un-aged battery will be approximately zero. Over time and over a drive cycle, the mean may change and become statistically significant and greater than zero. The new battery capacity can be estimated directly from a shift in the mean. In an example, the threshold is a shift of 5% in a shift in the mean.

Figure 11:
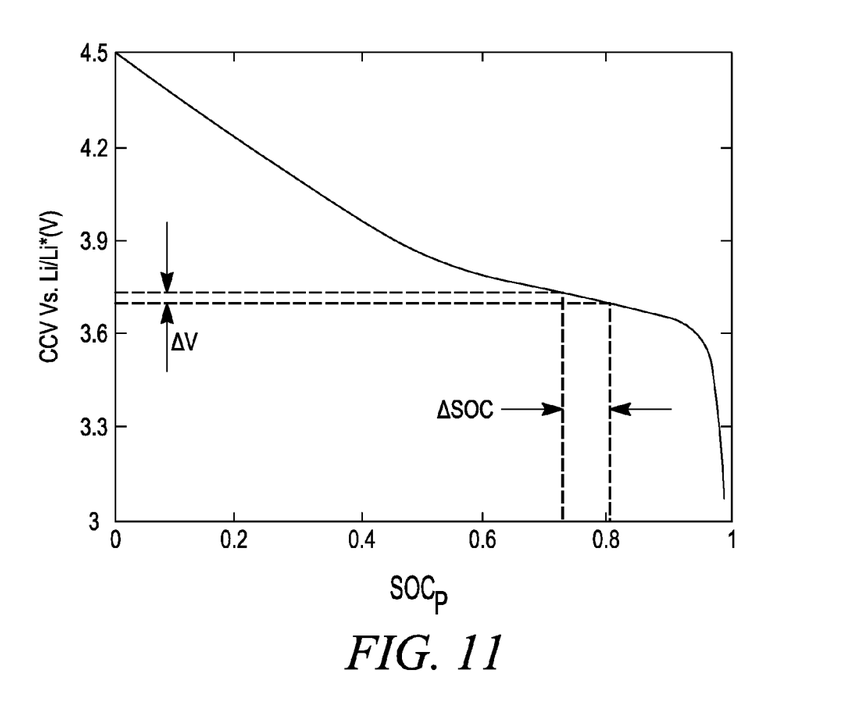
FIG. 11 is a graph of a calculated voltage change as a function of state of charge change.
Figure 12:
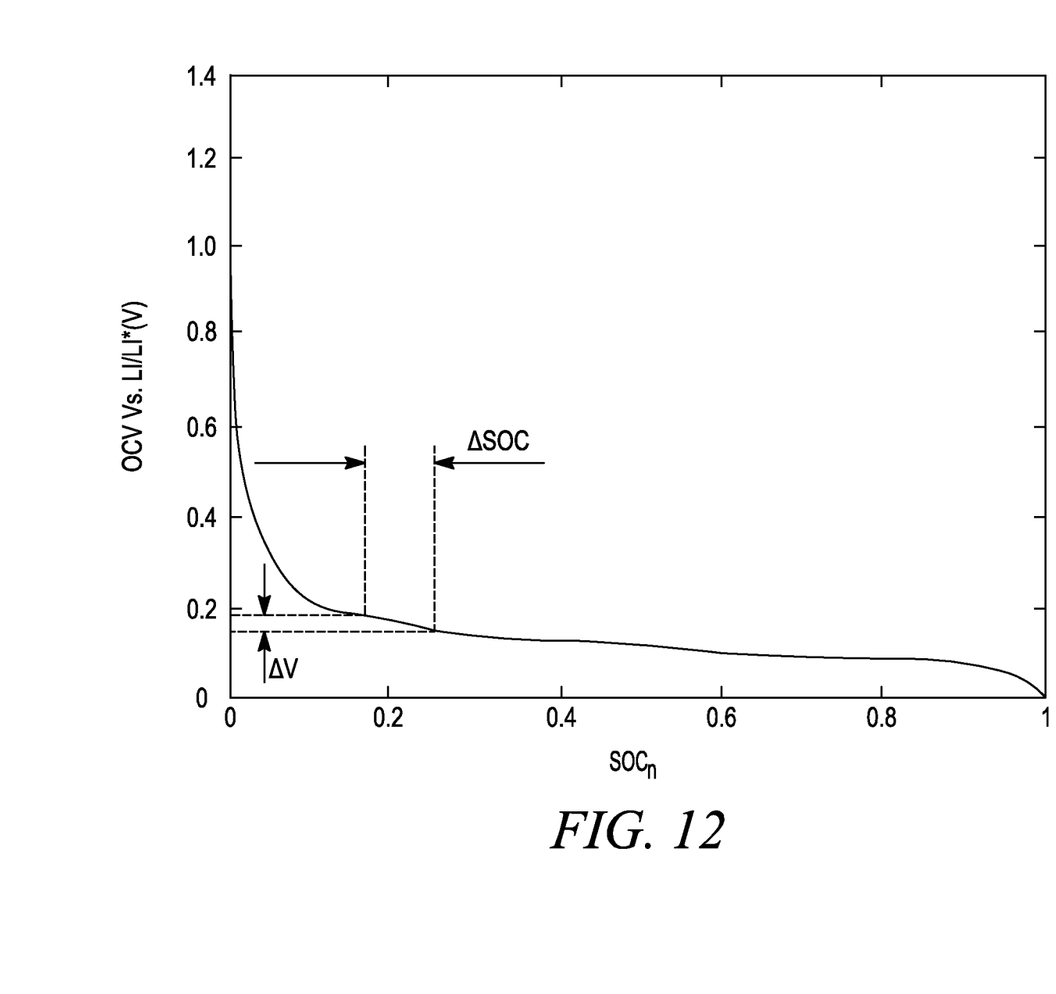
FIG. 12 is a graph of an active component contributing to a change in the battery capacity.

Turning now to the process flow of steps 507-513, the battery capacity fade may be due to loss of active chemistries in the battery, e.g., $Li^+$. If the battery capacity fade is due to the loss of active lithium, then capacity estimates made late in the drive cycle have larger error than those early in the drive cycle. The result is that the variance of the residual is larger than the nominal level, along with a small shift of the residual mean that is less than the case of positive electrode capacity loss. At 507, the increase in variance is taken into account and may be updated using $\delta^2 = \delta^2 + \Delta\delta^2$. At 509, the voltage error between the feedback loop estimate and the current integration estimate is used to calculate a voltage error using the open-circuit voltage of the positive electrode. An example is shown in FIG. 11. At 511, these voltage errors are used in an interpolation table of the negative electrode open circuit voltage to determine the new amount of active lithium. An example is shown in FIG. 12. At 513, the stored battery parameter of available active battery chemistry, e.g., lithium, is updated within the BMS.

It will be further understood that a feedback loop can be provided to the present system and method(s). In an example, an extended Kalman filter is applied to the data representing the positive electrode or to either electrode. Several other statistical methods beyond the mean and variance may be used to process the residual within the scope of the present disclosure.

Figure 6:
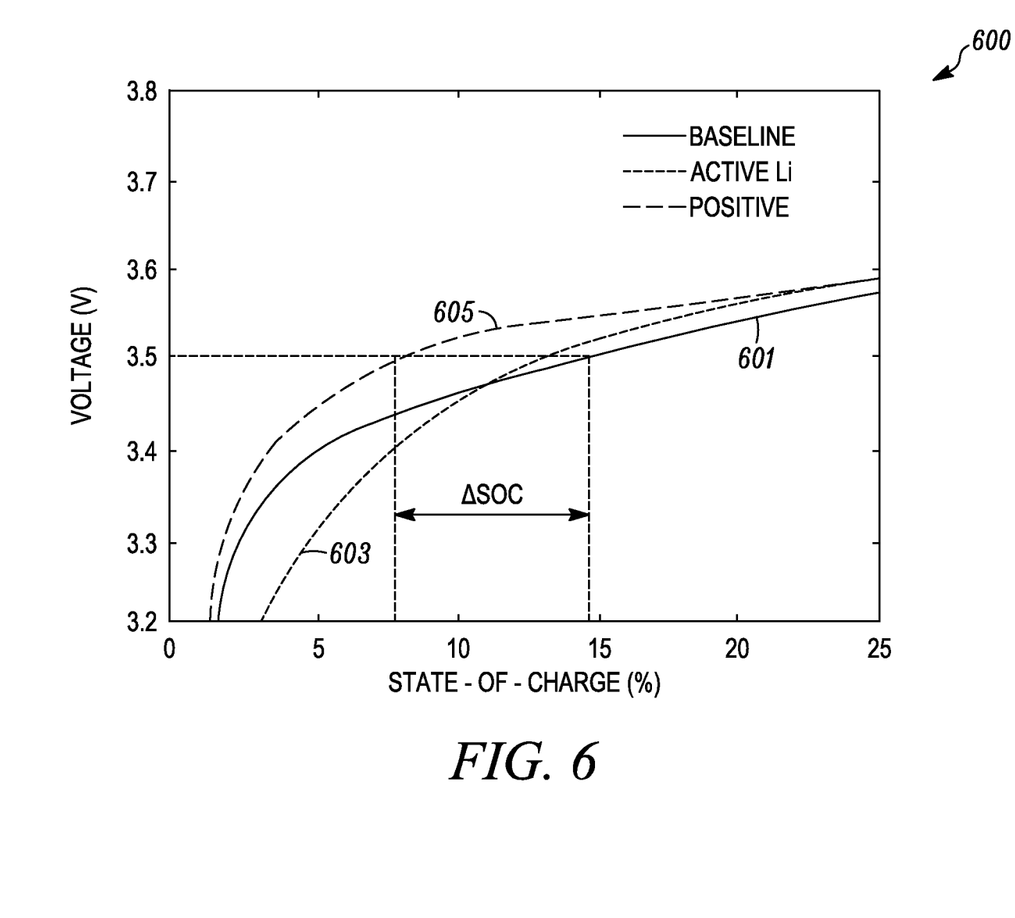
FIG. 6 is a graph showing prior and current battery open circuit voltage as a function of state of charge.

FIG. 6 shows a graph 600 of the battery's open-circuit voltage as a function of state of charge. The graph focuses on the lower quarter of the battery's state of charge as the low end of the state of charge is susceptible to errors in the detected open-circuit voltage. As a result, some vehicles do not rely on the low end of SOC to adequately power the vehicle using the battery. That is, this uncertainty in the actual battery parameters may cause the controller of the battery to default to a less efficient operating state. In some extreme control schemes, the controller does not use the low state of charge range due to the associated uncertainty. Accordingly, the effective energy of the battery decreases. Curve 601 is the baseline of the open-circuit voltage of an un-aged battery. An un-aged battery is a battery that is newly installed into the vehicle and can be based on test data. Curve 603 shows the effect of the positive electrode as used in a vehicle on electrode open-circuit voltage. Curve 605 shows the fade of the active ion effect as used in a vehicle on electrode open-circuit voltage as compared to the baseline curve 601. As shown, the fade curve 605 and positive capacity curve 603 show that there can be up to a 20% battery capacity fade caused by loss of active lithium or loss of capacity in the positive electrode. A battery management system that does not account for differences in the open-circuit voltage resulting from battery aging could lead to an inaccurate SOC parameter in the system. As shown in FIG. 6, there can be an approximately 8% (+/−2%) error between the positive capacity fade case (605) and the baseline case at 3.5 V indicated by ΔSOC. A similar argument could be made for the active lithium case, e.g., an up to approximately 8% error (+/−2%).

FIG. 7 shows a graph of a measured current and voltage at a traction battery. In this example, the measured current and voltage are taken over time during a drive cycle for a BEV or PHEV in electric-only mode. These measurements can be used to determine the contributions to battery capacity fade by electrode performance. The measured current during the drive cycle can be integrated continuously, e.g., in processors and modules in the vehicles, to determine the net electrical charge removed from the battery.

FIG. 8 shows a graph of an SOC estimate. Using SOC estimates at two distinct times, e.g., including one initial time at the beginning of the drive cycle and another time after a sufficient difference in SOC has been created, the positive electrode properties can be determined. The positive electrode properties can include positive electrode capacity, which may represent the degradation of operational performance, e.g., the ability of the positive electrode to conduct electrical charge to or from the battery. The process can be repeated using several different initial and final times to create a time series of positive electrode capacity estimates from vehicle key-on to key-off.

Figure 9:
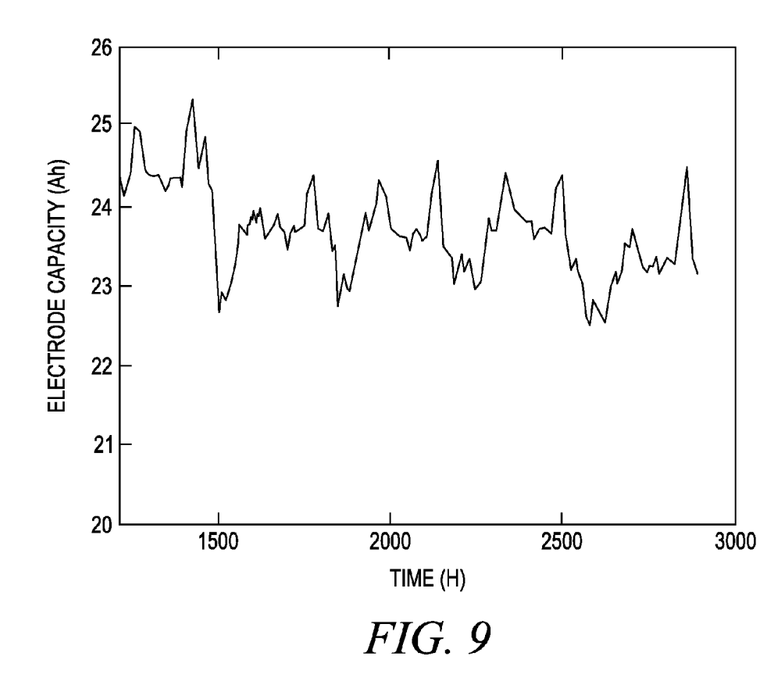
FIG. 9 is a graph of calculated electrode capacity.

FIG. 9 shows a graph of the calculated electrode capacity, which can be determined from the data in the FIG. 8 graph and related process. The electrode capacity estimates may be used to compare prior electrode capacity estimates, which can be stored in vehicle memory.

FIG. 10 shows a graph of statistical data from processing the electrode capacity data based on vehicle drive time. The effects of the un-aged battery and contribution to electrical performance due to mechanical components are estimated. The contributions of the mechanical components can include electrode effects, e.g., the positive electrode effects, the error residual properties, and the electrode capacity fade contribution of each electrode, which can be estimated. For example, the mean and variance of the residual for the entire drive cycle may be calculated. If the statistics satisfy certain threshold criteria, then the likely degradation mechanism is determined and the BMS parameters for the associated electrode can be corrected to account for the present level of degradation. In an example, if $\Delta Q=0$, the mean in amp-hours is $-0.5$ Ah and the variance is 0.3 Ah. This example may be the un-aged battery example. In an example, if $\Delta Q$ (active Li)=2 Ah, the mean in amp-hours is 0.8 Ah and the variance is 3.1 Ah. In an example, if $\Delta Q$ (positive electrode)=2.0 Ah, the mean in amp-hours is 2.2 Ah and the variance is 0.3 Ah. In an example, if $\Delta Q$ (combined) =2 Ah, the mean in amp-hours is 1.4 Ah and the variance is 2.6 Ah. If the threshold is set at 1.0 Ah, then the examples can be distinguished based on whether the mean, variance, or both mean and variance exceed the threshold value. The non-zero mean and variance for the un-aged example ($\Delta Q =0$) reflect typical modeling error and sensor noise.

Figure 13:
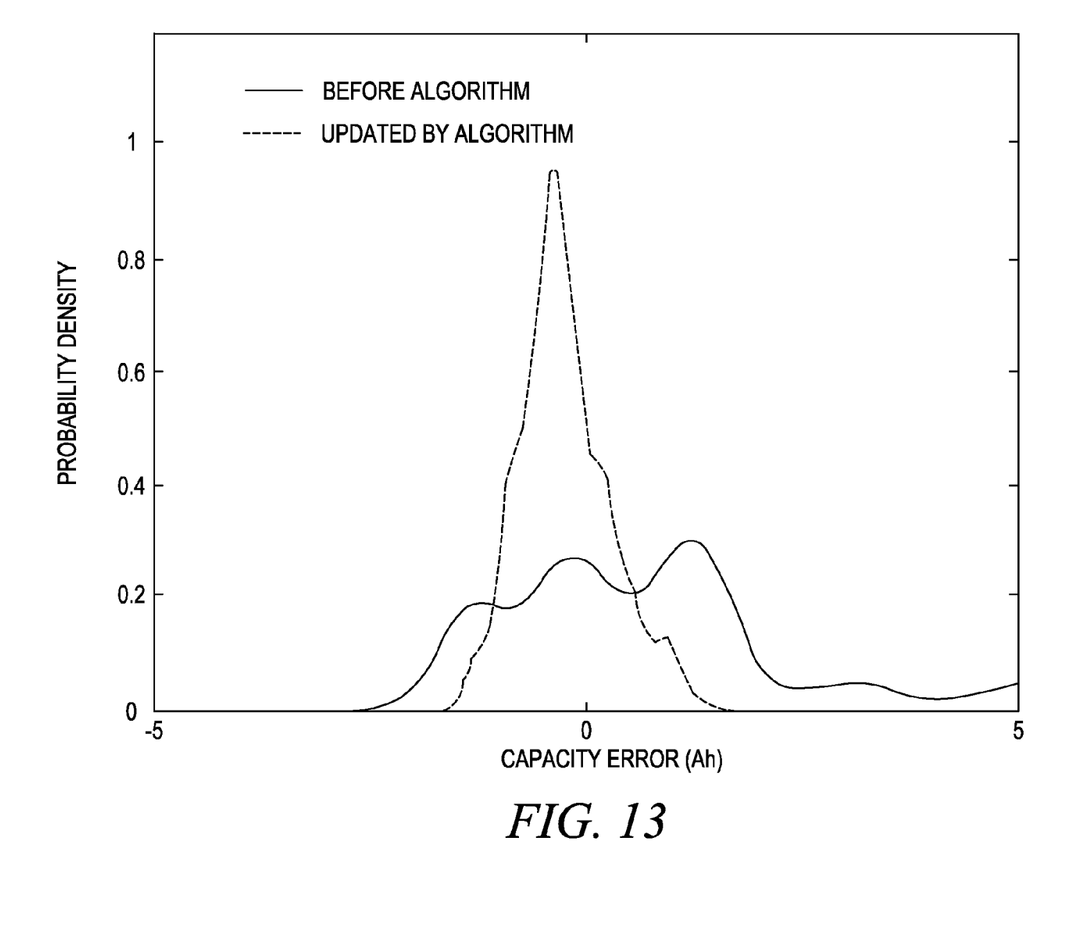
FIG. 13 is a graph of processing of the residual values of an active component to battery capacity change.

FIGS. 11 through 13 relate to the process when the variance threshold is violated. (See description of FIGS. 4 and 5.) The graphs of FIGS. 11 through 13 show data relating to correcting the active lithium component to the battery model.

FIG. 11 shows a graph of a calculated change in voltage ($\Delta V$) as a function of the change in SOC ($\Delta SOC$). This can be a result of the step 509 in the process described with reference to FIG. 5. If the battery capacity fade is due to the loss of active lithium, then the capacity estimates made late in the drive cycle have a larger error than those early in the cycle. The result is that the variance of the residual is larger than the nominal level, along with a small shift of the residual mean that is less than the case of positive electrode capacity loss. In this case, the SOC estimates from the end of the drive cycle are compared with estimates based purely on current integration. The error between the model-based estimate and the current integration estimate is used to calculate a voltage error using the open-circuit voltage of the positive electrode.

FIG. 12 shows a graph of the active lithium component contributing to a change in the battery capacity. This can be a result of the step 511 in the process described with reference to FIG. 5. The voltage errors are used in an interpolation table of the negative electrode open circuit voltage (OCV) to determine the new amount of active lithium.

FIG. 13 shows a graph of statistical processing of the residual values of the active lithium component to battery capacity change. This graph shows that updating the battery model reduces the likelihood of error in the battery model.

FIG. 14 shows a graph of correcting error in the battery model relating to the positive electrode component.

The embodiments of the present disclosure generally provide for a plurality of circuits or other electrical devices, e.g., processor(s), logic circuitry, memory logic arrays, etc. All references to the circuits, circuitry and other electrical devices and the functionality provided by each, are not intended to be limited to encompassing only what is illustrated and described herein. While particular labels may be assigned to the various circuitry or other electrical devices disclosed, such labels are not intended to limit the scope of operation for the circuitry and the other electrical devices. Such circuitry and other electrical devices may be combined with each other and/or separated in any manner based on the particular type of electrical implementation that is desired. It is recognized that any circuitry or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and instructions (e.g., code or software) which co-act with one another to perform operation(s) disclosed herein. In addition, any one or more of the electric devices may be configured to execute a computer-program that is embodied in a non-transitory computer readable medium that is programmed to perform any number of the functions as disclosed. Further the modules and devices described herein can include the circuitry and electrical devices to connect to other devices and perform the methods described herein. It will be appreciated that battery parameters described herein can be calculated using these structures and devices and stored with such devices for later use in calculations and control of an electrified vehicle.

Some prior approaches to estimating battery capacity rely on a first order equivalent circuit with a single relationship for the battery open-circuit voltage versus state-of-charge. This approach may not resolve the contributions of each battery electrode. There may be benefits to the electrode-resolved algorithm that include more accurate energy and power estimation, as well as improved state-of-charge estimation. More accurate battery capacity estimation can lead to improved fuel economy and consistently better vehicle performance by informing optimized control algorithms.

By identifying the capacity fade mechanism and incorporating these mechanism(s) into battery capacity estimation, it becomes easier to relate observed changes in battery capacity to battery power, and vice versa. In an example described in greater detail herein, if the battery capacity fade is due to loss of positive electrode capacity, there is a higher apparent current density within the electrode for the same external current demand. This can lead to a higher battery resistance and decreased power. Alternatively, accurate knowledge of the amount of active lithium can be used to estimate the thickness of resistive films (a mechanical structure that affects electrical performance) formed at each electrode, which act to decrease power.

If an interpolation table or other stored battery parameters are used to relate open-circuit voltage to state of charge, and the relationship is not updated using the electrode-resolved method described herein, battery state-of-charge reporting errors are possible. The low state of charge region (less than 50% SOC, less than 40% SOC, or less than 30% SOC) is particularly affected by this process. If the low state of charge range is not usable due to the associated uncertainty, the effective energy capacity or range of the battery decreases. The potential battery capacity accuracy by the present method(s) provides an improvement when compared with prior methods. Such an improvement can be up to about 10% or up to about 8%.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A traction-battery control method comprising:
   responsive to an electrode capacity of the battery exceeding a threshold, updating an input to a feedback algorithm programmed to output state of charge (SOC) for the battery, wherein the electrode capacity is based on a change in the SOC and a sensed current for the battery during a drive cycle; and
   responsive to a variance parameter being violated, outputting voltage error based on SOC error using current integration.

2. The method of claim 1 further comprising, in response to the variance parameter being violated, outputting an active lithium value based on a previous active lithium parameter, a voltage error and a negative electrode open circuit voltage.

3. The method of claim 1, wherein the sensed current is influenced by active lithium ions at a positive electrode of the battery.

4. The method of claim 1, wherein the sensed current includes sensed current throughput data.

5. The method of claim 1, wherein updating the input includes initiating an electrode capacity correction using a mean of electrode capacity residual to correct capacity error to less than one amp-hour.

6. The method of claim 1, wherein updating the input includes initiating an active lithium capacity correction using a variance of electrode capacity residual to correct capacity error to less than one amp-hour.

7. A traction battery control system comprising:
   a traction battery; and
   at least one processor programmed to:
   in response to an electrode capacity indicative of an age of the battery exceeding a threshold, update an input to a feedback algorithm implemented to output state of charge for the battery, wherein the electrode capacity is based on a change in the state of charge and a sensed drive-cycle current for the battery, and
   in response to a variance parameter being violated, output an active lithium value based on a previous active lithium parameter, a voltage error and a negative electrode open circuit voltage.

8. The system of claim 7, wherein the at least one processor is further programmed to, in response to the variance parameter being violated, output voltage error based on state of charge error using current integration.

9. The system of claim 7, wherein the sensed current is influenced by active lithium ions at a positive electrode of the battery.

10. The system of claim 7, wherein the sensed current includes sensed current throughput data.

11. The system of claim 7, wherein updating the input includes initiating an electrode capacity correction using a mean of electrode capacity residual to correct capacity error to less than one amp-hour.

12. The system of claim 7, wherein updating the input includes initiating an active lithium capacity correction using a variance of electrode capacity residual to correct capacity error to less than one amp-hour.

13. A method for controlling a traction battery of a vehicle comprising:
   in response to an electrode capacity of the battery exceeding a threshold, updating an input to a feedback algorithm programmed to output state of charge (SOC) for the battery, wherein the electrode capacity is based on a change in the SOC and a sensed current for the battery during a drive cycle; and wherein updating the input includes initiating an electrode capacity correction using a mean of electrode capacity residual to correct capacity error to less than one amp-hour.

14. The method of claim 13, further comprising, in response to a variance parameter being violated, outputting voltage error based on state of charge error using current integration; and
   in response to the variance parameter being violated, outputting an active lithium value based on a previous active lithium parameter, a voltage error and a negative electrode open circuit voltage.

15. The method of claim 14, wherein the sensed current is influenced by active lithium ions at a positive electrode of the battery.

16. A method for controlling a traction battery of a vehicle comprising:
   in response to an electrode capacity of the battery exceeding a threshold, updating an input to a feedback algorithm programmed to output state of charge (SOC) for the battery, wherein the electrode capacity is based on a change in the SOC and a sensed current for the battery during a drive cycle; and wherein updating the input includes initiating an active lithium capacity correction using a variance of electrode capacity residual to correct capacity error to less than one amp-hour.

17. The method of claim 16, further comprising, in response to a variance parameter being violated, outputting voltage error based on state of charge error using current integration.

18. The method of claim 16, further comprising, in response to a variance parameter being violated, outputting an active lithium value based on a previous active lithium parameter, a voltage error and a negative electrode open circuit voltage.

19. The method of claim 16, wherein updating the input includes initiating an electrode capacity correction using a mean of electrode capacity residual to correct capacity error to less than one amp-hour.

* * * * *